United States Patent
Hayashida et al.

(10) Patent No.: US 6,194,666 B1
(45) Date of Patent: Feb. 27, 2001

(54) PUSH PULL TYPE CONTROL CABLE

(75) Inventors: Takaaki Hayashida; Hideki Imai, both of Nagoya (JP)

(73) Assignee: Chuo Hatsujo Kabushiki Kaisha, Nagoya (JP)

(*) Notice: Subject to any disclaimer, the term of this patent is extended or adjusted under 35 U.S.C. 154(b) by 0 days.

(21) Appl. No.: 09/271,986

(22) Filed: Mar. 19, 1999

(30) Foreign Application Priority Data

Mar. 20, 1998 (JP) .................................... 10-072432
Mar. 20, 1998 (JP) .................................... 10-072543

(51) Int. Cl.$^7$ .................................................. H01B 5/08
(52) U.S. Cl. ...................... 174/128.1; 174/128.2
(58) Field of Search ..................... 174/126.1, 126.2, 174/128.1, 128.2, 68.1, 102 R, 105 R

(56) References Cited

U.S. PATENT DOCUMENTS

| | | | |
|---|---|---|---|
| 2,605,201 | * 7/1952 | Howe | 174/126.1 |
| 2,689,399 | * 9/1954 | Gray | 174/126.1 X |
| 2,870,311 | * 1/1959 | Greenfield et al. | 174/128.1 X |
| 3,131,469 | * 5/1964 | Glaze | 174/128.1 X |
| 3,676,576 | * 7/1972 | Dubernet et al. | 174/128.1 X |
| 3,686,428 | * 8/1972 | Lombardi et al. | 174/128.1 |
| 5,170,015 | * 12/1992 | Kudo et al. | 174/128.1 |
| 5,558,794 | * 9/1996 | Jansens | 174/108 X |
| 5,789,708 | * 8/1998 | Cocito | 174/68.1 |
| 6,078,010 | * 6/2000 | Funahashi et al. | 174/126.1 |

* cited by examiner

Primary Examiner—Kristine Kincaid
Assistant Examiner—Chau N. Nguyen
(74) Attorney, Agent, or Firm—Morgan, Lewis & Bockius LLP

(57) ABSTRACT

In a push pull type control cable, a conduit has a tubular liner made of a plastic material. A wire is provided by winding a diameter-reduced side wire around a core wire, and arranged to be axially movably placed within the liner. A zinc plating is coated on an outer surface of the side wire, a thickness of the plating ranging from 5.0 $\mu$m to 20 $\mu$m. The core wire is made of a steel, and a diameter of the core wire ranges from 1.2 mm to 1.6 mm. The side wire forms a row of steel lines which are single wound around the core wire at a predetermined lead angle (13 degrees to 25 degrees), a diameter of each of the steel lines ranging from 0.25 mm to 0.60 mm.

6 Claims, 6 Drawing Sheets

Before Experimental Test

After Experimental Test

PUSH PULL TYPE CONTROL CABLE

BACKGROUND OF THE INVENTION

Field of the Invention

The invention relates to a push pull type control cable which is improved to impart a good operability with an added comfortability.

In a push pull type control cable which connects a shift lever to a vehicular transmission, a wire is provided by winding a side wire around a core wire, and arranged to be axially movably placed within a liner. A zinc plating treatment is provided on an outer surface of the side wire to impart a rust resistant property and facilitate a mobility at once between the wire and the liner.

On the other hand, the side wire forms a multitude of steel lines wound around the core wire at a predetermined lead angle.

However, an endurance of the zinc plating treatment has not been satisfactorily considered, and its thickness dimension has been 1.0~3.0 $\mu$m. With the passage of service time, it is feared that the zinc plating separates partly from the side wire due to the friction against the liner so as to increase a coefficent of friction. The increased coefficent of friction reduces a load efficiency which represents a ratio of an output load to input load so as to eventually reduce the operability and sensible quality. This resultantly requires the replacement of the control cable itself.

In the meanwhile, a relationship between the lead angle and the load efficiency has not seriously been taken into account. In order only to prevent the side wire from getting loose, the lead angle has been determined to be 25~30 degrees. With the increase of the lead angle, it is found that a contact area between the side wire and the liner increases to add a further frictional resistance therebetween so as to reduce the load efficiency. Once the contact area has increased, a frictional surface of the liner predominantly wears to increase the contact area acceleratively so as to significantly reduce the load efficiency with an added frictional resistance.

The reduced load efficiency requires an added operable force to deteriorate the sensible quality with decreased endurance. In recent years, it has been demanded to ameliorate the sensible quality, and at the same time, enabling consumers to a maintenance free period long enough to reach a product life span in the field of durable consumer goods such as a motor vehicle.

Therefore, the present invention has made with the above drawbacks in mind, it is a main object of the invention to provide a push pull type control cable which enables consumers to an extended maintenance free period with a high load efficiency and sensible quality.

SUMMARY OF THE INVENTION

According to the present invention, there is provided a push pull type control cable including a conduit having a tubular liner made of a plastic material; a wire provided by winding a diameter-reduced side wire around a core wire, and arranged to be axially movably placed within the liner; and a plating being coated on an outer surface of the side wire, a thickness of the plating ranging from 5.0 $\mu$m to 20 $\mu$m.

With the plating coated to range from 5.0 $\mu$m to 20 $\mu$m, it is possible to provide a good operability and sensible quality for an extended period of time. When the control cable is used to connect a shift lever to a vehicular transmission, it is possible to practically eliminate the necessity of replacing the control cable with a new one. This reduces time and cost required to check and repair the motor vehicle.

In this instance, the conduit has the liner surrounded by a thin strand wire covered with a liquid-repellent jacket. With the side wire single wound around the core wire, it is possible to advantageously contribute to cost-saving while ensuring a good rigidity.

According to another aspect of the present invention, the side wire forms a multitude of steel lines which are single wound around the core wire at a lead angle ranging from 13 degrees to 25 degrees, and a diameter of each of the steel lines ranging from 0.25 mm to 0.60 mm.

With the lead angle ranging from 13 degrees to 25 degrees, it is possible to a contact area between the side wire and the liner, thus reducing the frictional resistance therebetween so as to increase the load efficiency with a least operable force. This produces a push pull type cable with a good sensible quality and endurance.

With the diameter of the steel lines of the side wire ranging from 0.20 mm to 0.60 mm, it is possible to secure a freedom flexible enough to route the cable while ensuring a good rigidity and endurance.

BRIEF DESCRIPTION OF THE DRAWINGS

A preferred form of the present invention is illustrated in the accompanying drawings in which.

DETAILED DESCRIPTION OF THE PREFERRED EMBODIMENTS

Figure 1:
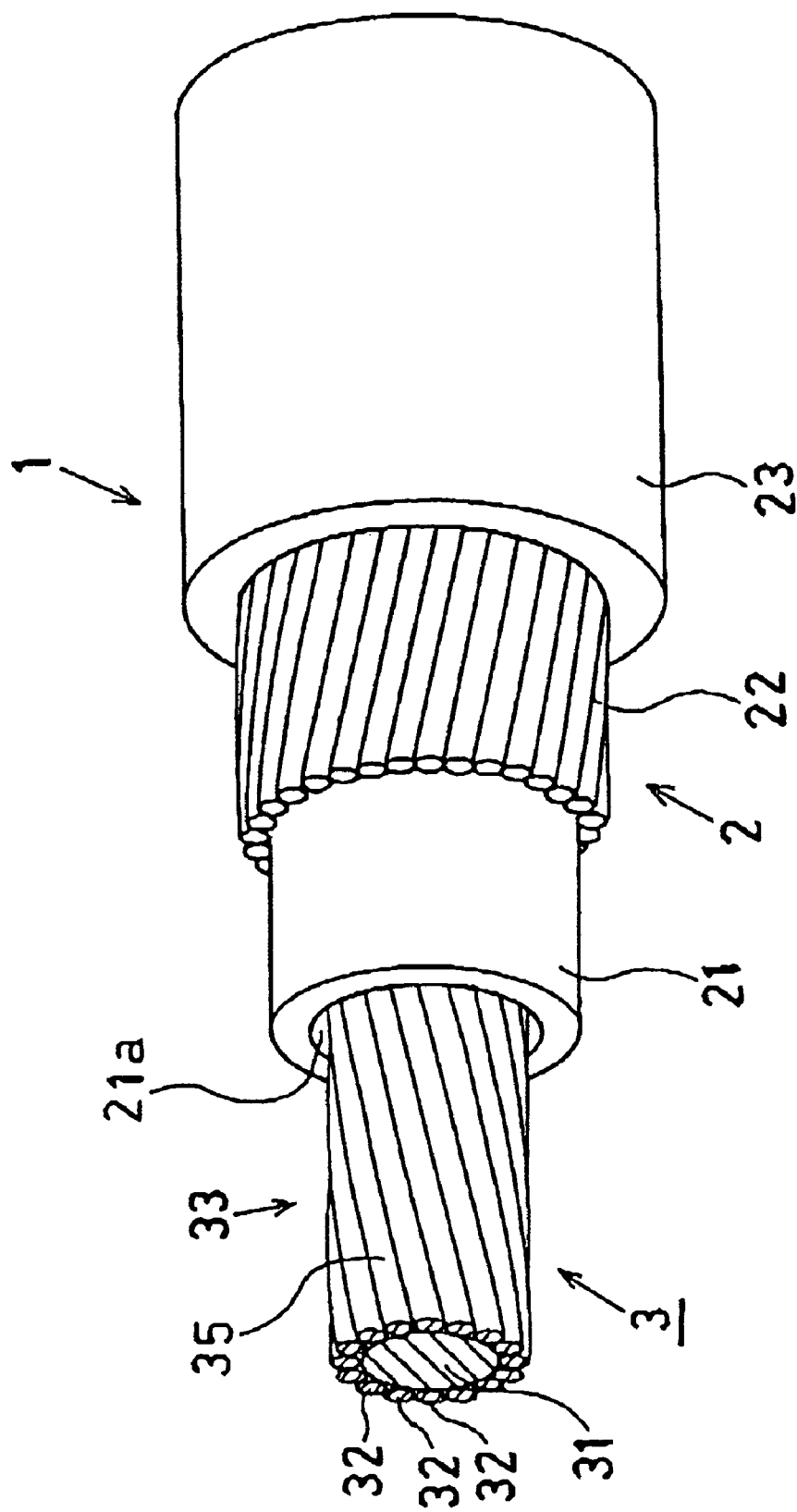
FIG. 1 is a perspective view of a push pull type control cable according to a first embodiment of the invention.

Referring to FIG. 1 which shows a push pull type control cable 1 according to a first embodiment of the present invention, the control cable 1 has a conduit 2 having a tubular liner 21 made of a thermoplastic material such as polybutyleneterephthalate, PTFE or the like. A side wire 33 is provided in which a multitude of thin steel lines 32 are single wound around an outer surface of a core wire 31 at a certain pitch interval to form a wire 3. The wire 3 is axially movably placed within the liner 21 to connect a shift lever to a vehicular transmission (not shown).

The conduit 2 (referred also to as "outer cable") has a strand portion 22 which consists of a multitude of steel lines (e.g., 0.83 mm in dia.) wound around the liner 21. Around an outer surface of the strand portion 22, a liquid repellent jacket 23 is provided to shield the strand portion 22. As a material of the liner 21, fluoro-based, polyolefine based, or polyether based plastics can be used.

In this instance, a diameter of the core wire 31 is e.g., 1.4 mm (1.2~1.6 mm), and diameters of the thin steel lines 32 are each e.g., 0.3 mm (0.2~0.6 mm). The steel lines of the strand portion 22 is acceptable as long as their diameter ranges from 0.6 mm to 1.0 mm. It is practical to use the core wire 31, the diameter of which ranges from 1.2 to 1.6 mm in order to obtain a sufficient push pull rigidity, and defining the wire size within an appropriate dimension. Although it is desirable to single wind the steel lines 32 of the side wire 33 around the core wire 31 to reduce the cost while ensuring a good rigidity, the steel lines 32 may be multiple wound around the core wire 31.

Figure 2:
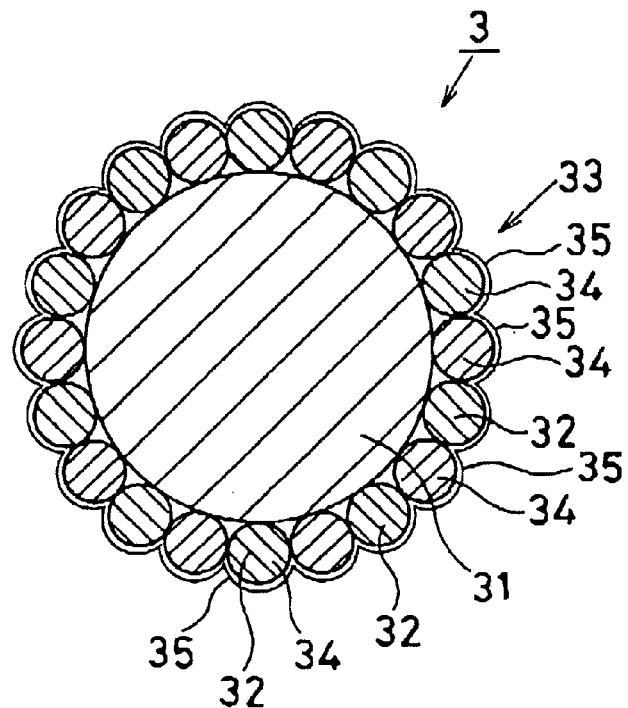
FIG. 2 is a latitudinal cross sectional view of the push pull type control cable.

In an outer surface of the steel lines 32 of the side wire 33, a zinc plating treatment is provided on metal lines underneath 34 of the steel lines 32 to form a plating layer 35 as shown in FIG. 2. A thickness of the plating layer 35 ranges from 5.0 to 20 $\mu$m. A surface roughness (Ra) of the plating layer 35 is e.g., 0.06 $\mu$m. While the coefficient of static friction between the metal lines underneath 34 and the liner 21 is 0.32, the coefficient of static friction between the plating layer 35 and the liner 21 reduces to 0.26.

In this instance, the plating layer 35 is practically acceptable as long as the surface roughness (Ra) is 0.2 $\mu$m or less.

Figure 3:
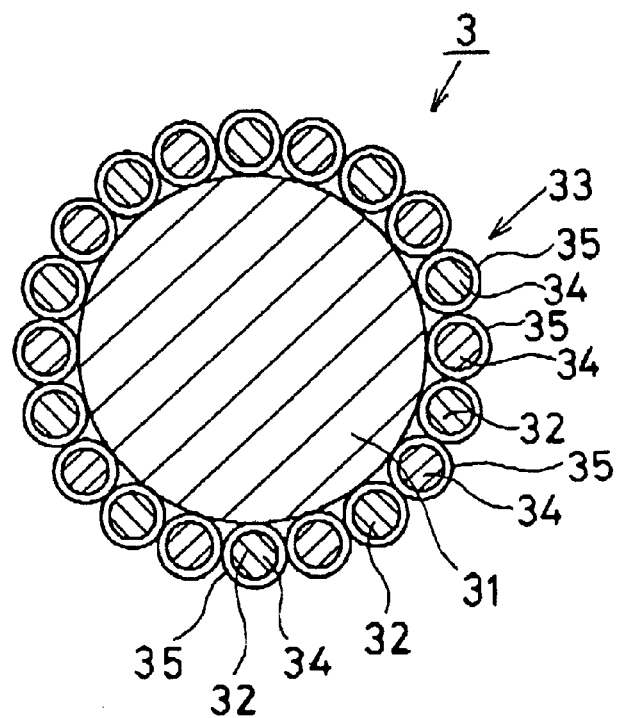
FIG. 3 is a latitudinal cross sectional view of the push pull type control cable according to a modification form of a plating layer.

The plating layer 35 smooths the outer surface of the steel lines 32 to reduce the friction between the side wire 33 and the liner 21 when the wire 3 moves axially within the liner 21. For this reason, the plating layer 35 is provided on only half the outer surface of the steel lines 32 facing an inner wall 21a of the liner 21 and opposite to the core wire 31 (FIG. 2). It, however, stands as a matter of course that the plating layer 35 is provided all the outer surface of the steel. lines 32 as shown in FIG. 3 before the steel lines 32 are wound to the core wire 31.

Figure 4:
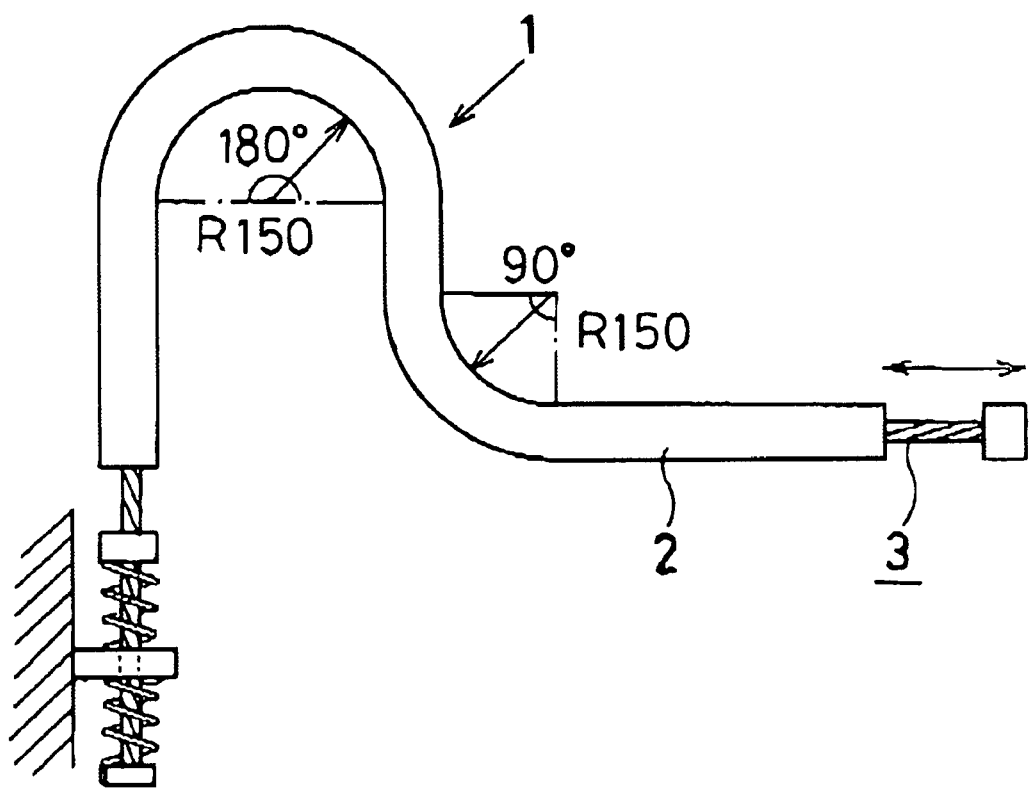
FIG. 4 Is a schematic view of an endurance experimental test device.

Upon determining the thickness range of the plating layer 35, an endurance experimental test was carried out by using an experimental test device as shown in FIG. 4. In the endurance experimental test, a push pull control type cable (50 cm in length) was used to move a wire one million times repetitively by a load force of 200 Newton with ±30 mm as one reciprocal stroke distance. This is equivalent to the situation in which a vehicular transmission has been worked approximately for one decade. Seven products were used in the endurance experimental test, each thickness (t) of which is 4.5 $\mu$m or less, and seven products were also used, each thickness (t) of which is 6.0. $\mu$m or more. Through all the twelve products, the surface roughness (Ra) of the plating layer 35 is commonly 0.06 $\mu$m.

Figure 5:
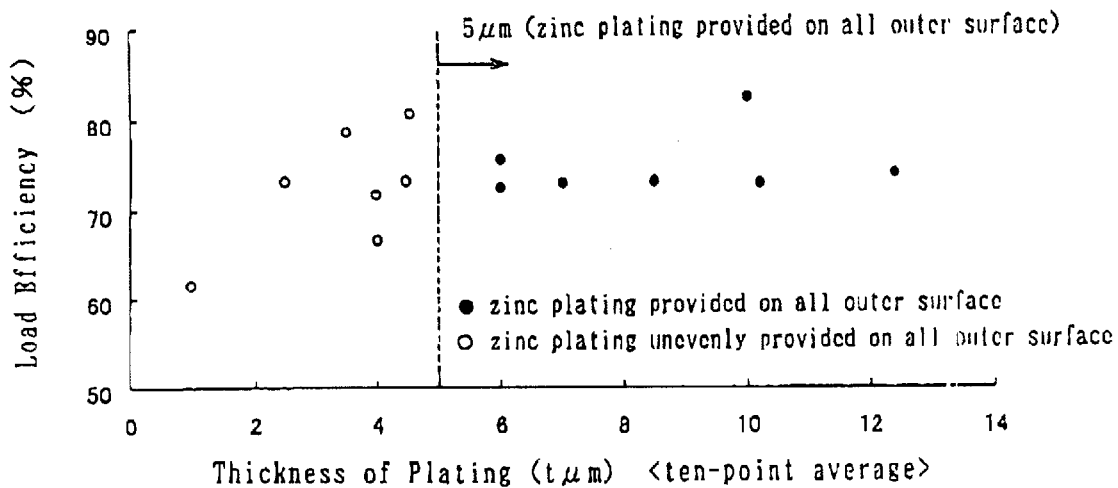
FIG. 5 is a graphical representation showing a relationship between a load efficiency and a thickness of a plating layer before carrying out an endurance experimental test.
Figure 6:
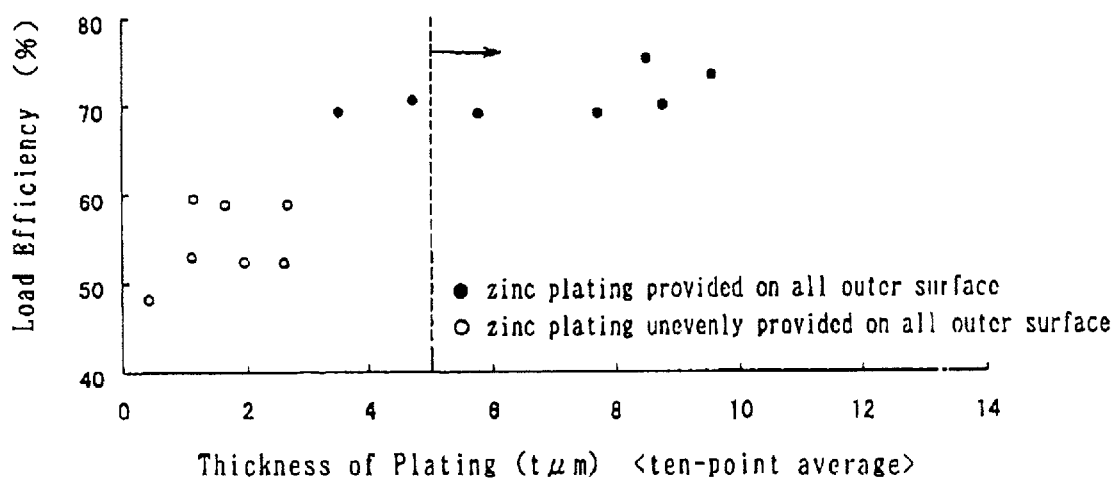
FIG. 6 is a graphical representation showing a relationship between a load efficiency and a thickness of a plating layer after carrying out the endurance experimental test.

Endurance experimental test results are shown in FIG. 5 which represents a relationship between the thickness (t) of the plating layer 35 and a load efficiency. When the thickness (t) of the plating layer 35 exceeds 5.0 $\mu$m, it is possible to ensure the load efficiency up to 70% or more which poses no substantial problem after repeating the endurance experimental test one million times. This requires no replacement of the push pull type control cable after repeating the endurance experimental test one million times.

When the thickness (t) of the plating layer 35 reduces to be short of 5.0 $\mu$m, it is feared that the plating layer is partly worn at a bight section due to an excessive friction so as to expose the metal lines underneath 34. This reduces the load efficiency down to 60% or less, thus requiring to replace the push pull type control cable with a new one. The thickness (t) of the plating layer 35 is 20 $\mu$m or less because it is impractical and costly when the thickness (t) exceeds 20 $\mu$m.

The plating layer 35 can be provided by treating the steel lines 32 with an electrical zinc plating or by dipping the steel lines 32 in a molten zinc bath. Instead of using zinc, Fe—Zn based alloy or Sn—Zn based alloy may be applied. A lubricating grease may be applied between a sliding section of the side wire 33 and that of the liner 21 so as to ameliorate the load efficiency.

To be more specific upon working the steel lines 32 of the wire 33, a zinc plating (25~60 $\mu$m in thickness) is provided uniformly on matrix lines (1.5~2.0 $\mu$mm each in dia.), and the matrix lines are drawn to form the plating layer 35 defined in the present invention. The drawing process hardens the texture of the steel lines 32 while smoothing an outer surface of the plating layer 35. This also helps uniformly even the thickness (t) of the plating layer 35, and adding a wear resistant property.

Conditions required for a dice in the drawing step are as follows:

The number of working processes is commonly nineteen (preferably 18~22).

An inclination angle of the dice is 17 degrees (preferably 15~20 degrees).

Figure 7:
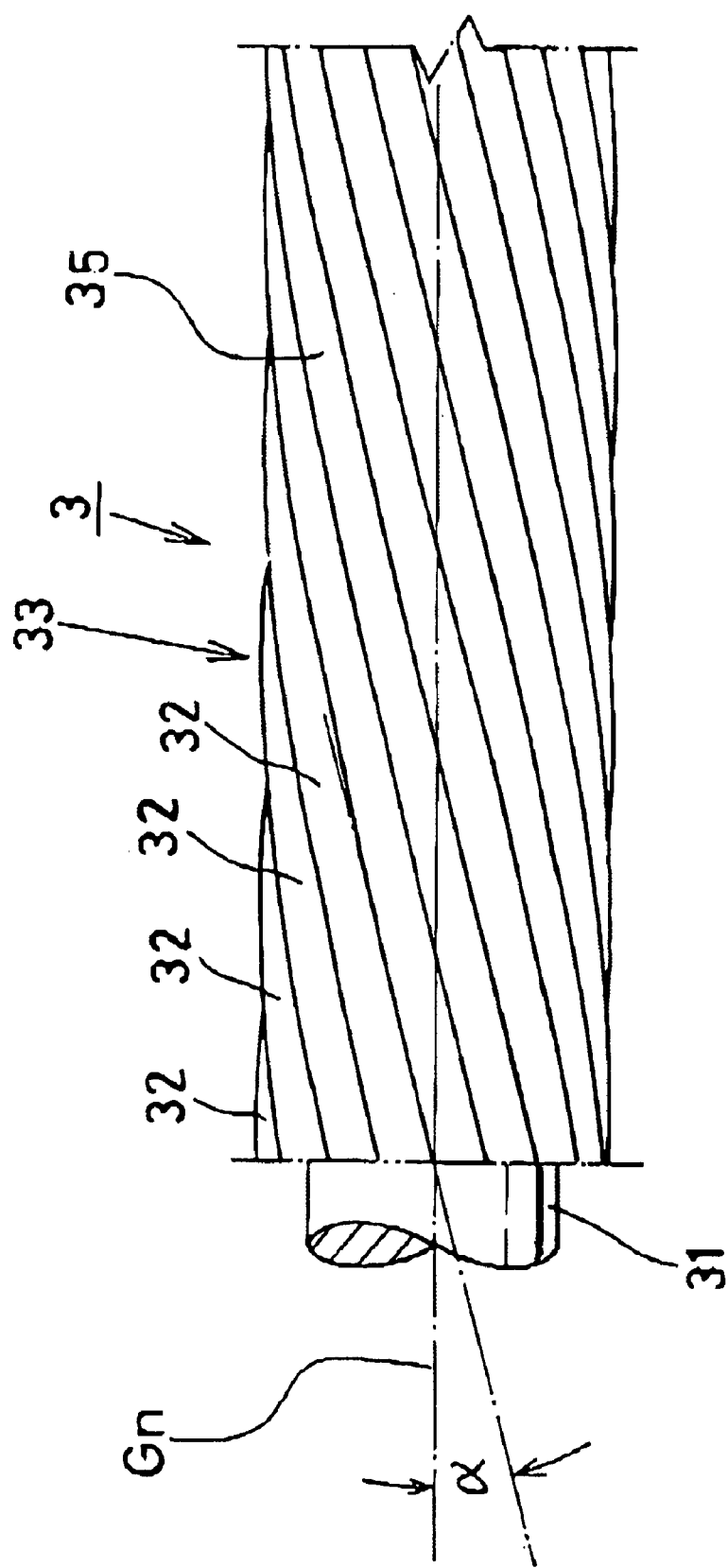
FIG. 7 is an enlarged plan view of a wire of a push pull type control cable according to a second embodiment of the invention.
Figure 8:
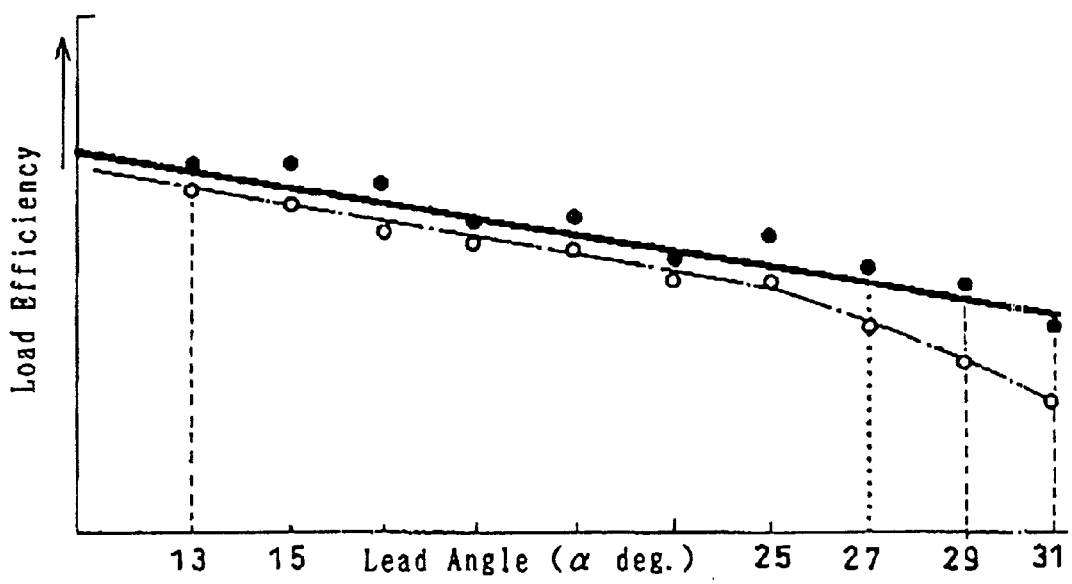
FIG. 8 is a graphical representation showing a relationship between a lead angle ($\alpha$) and a load efficiency.
Figure 9:
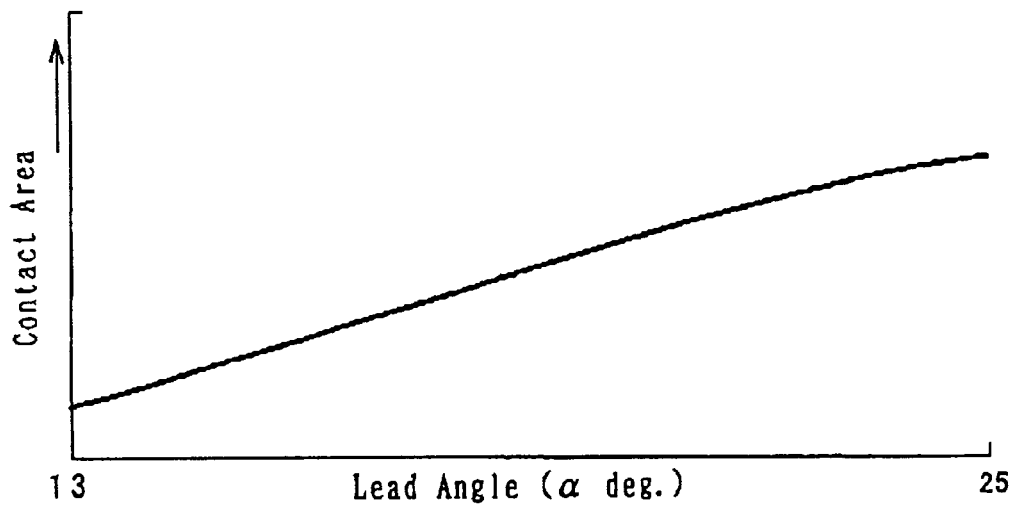
FIG. 9 is a graphical representation showing a relationship between the lead angle ($\alpha$) and a contact area among a side wire and the liner.

FIG. 7 shows a second embodiment of the present invention in which the steel lines 32 has a lead angle ($\alpha$=e.g., 15 degrees) against a generating line (Gn) of the core wire 31 in FIGS. 1, 2 and 3. FIG. 8 is a graphical representation showing a relationship between the lead angle ($\alpha$) and the load efficiency. FIG. 9 is a relationship between the lead angle ($\alpha$) and the contact area among the side wire 33 and the liner 21. As found from FIGS. 8 and 9, when the lead angle ($\alpha$) is short of 13 degrees, there arises a possibility that the side wire comes loose from the core wire 31. With the increase of the lead angle ($\alpha$), the contact area between the side wire 33 and the liner 21 increases to reduce the load efficiency. In order to satisfy these conditions, it is necessary to determine the lead angle ($\alpha$) by the following formula.

13 degrees$\leq$lead angle ($\alpha$)$\leq$25 degrees (preferably 15 degrees$\leq$lead angle ($\alpha$)$\leq$20 degrees)

Upon determining the angular range of the lead angle ($\alpha$), an endurance experimental test was carried out by using the experimental test device as shown in FIG. 4. In the endurance experimental test, a push pull control type cable (50 cm in length) was used to move a wire one million times repetitively by a load force of 200 Newton with ±30 mm as one reciprocal stroke distance. This is equivalent to the situation in which a vehicular transmission has been worked approximately for one decade. Three comparative products were used in the endurance experimental test, the lead angle ($\alpha$) of which are in turn 27, 29 and 31, and seven invention products were used, the lead angle ($\alpha$) of which is in turn 13, 15, 17, 19, 21, 23 and 25.

Endurance experimental test results are shown at the phantom line in FIG. 8. As found from FIG. 8, when the lead angle ($\alpha$) is 25 degrees or less, it is possible to ensure the load efficiency up to 70% or more which poses no substantial problem after repeating the endurance experimental test one million times. This requires no replacement of the push pull type control cable after repeating the endurance experimental test one million times.

When the lead angle ($\alpha$) exceeds 25 degrees, it is feared that the liner is partly worn at a bight section due to an excessive friction so as to reduce the load efficiency down to 60% or less. This requires to replace the push pull type control cable with a new one. The lead angle (α) requires at least 13 degrees because it is feared that the side wire 33 likely gets loose from the core wire 31 when the lead angle (α) becomes short of 13 degrees.

In the second embodiment of the present invention, since the lead angle (α) ranges from 13 to 25 degrees in addition to the plating layer 35 provided on the side wire 33, it is possible to synergestically reduce the frictional resistance between the side wire 33 and the liner 21 so as to significantly ameliorate the load efficiency. In this instance, a lubricating grease may be applied between a sliding section of the side wire 33 and that of the liner 21 so as to ameliorate the load efficiency.

It is to be noted that in the second embodiment of the present invention, the plating layer 35 can be omitted from the side wire 33.

While there has been described what is at present thought to be preferred embodiments of the invention, it will be understood that modifications may be made therein and it is intended to cover in the appended claims all such modifications which fall within the scope of the invention.

What is claim is:

1. A push pull type control cable comprising:

a conduit having a tubular liner made of a plastic material;

a wire provided by winding a diameter-reduced side wire around a core wire, and arranged to be placed within said liner so as to be frictionally movable therewithin in an axial direction in response to a push pull force; and a plating being coated on an outer surface of said side wire, a thickness of said plating ranging from 5.0 $\mu$m to 20 $\mu$m, wherein said core wire is made of a steel metal, and a diameter of said core wire ranges from 1.2 mm to 1.6 mm, and said side wire forms a multitude of steel lines which are single wound around said core wire at a predetermined lead angle, a diameter of each of said steel lines ranging from 0.20 mm to 0.60 mm.

2. A push pull type control cable as recited in claim 1, wherein said plating is selected from the group consisting of Zn, Fe—Zn alloy, and Sn—Zn alloy platings, and a surface roughness (Ra) of said plating is 0.2 $\mu$m or less.

3. A push pull type control cable as recited in claim 1, wherein said predetermined lead angle ranges from 13 degrees to 25 degrees, and said diameter of each of said steel lines ranges from 0.25 mm to 0.60 mm.

4. A push pull type control cable as recited in claim 3, wherein said plating is selected from the group consisting of Zn, Fe—Zn alloy, and Sn—Zn alloy platings, and a surface roughness (Ra) of said plating is 0.2 $\mu$m or less.

5. A push pull type control cable as recited in claim 4, wherein said plating is coated on only half the outer surface portion of said side wire, said half the portion facing an inner wall of said liner and opposite to said core wire.

6. A push pull type control cable as recited in claim 1, wherein said plating is coated on only half the outer surface portion of said side wire, said half the portion facing an inner wall of said liner and opposite to said core wire.

\* \* \* \* \*